United States Patent [19]  
Miliczky et al.

[11] 3,876,213  
[45] Apr. 8, 1975

[54] REMOTE FILL STUFFING BOX

[75] Inventors: Eugene W. Miliczky, North Tonawanda; Martin J. Hannah, Williamsville; Clifford F. Bea, Alden, all of N.Y.

[73] Assignee: Advanced Thermal Systems, Inc., Lancaster, N.Y.

[22] Filed: Nov. 9, 1973

[21] Appl. No.: 414,261

[52] U.S. Cl.................................. 277/2; 277/59
[51] Int. Cl............................................ F16j 15/18
[58] Field of Search .................. 277/2, 3, 15, 59

[56] References Cited
UNITED STATES PATENTS

| | | | |
|---|---|---|---|
| 1,757,311 | 5/1930 | Kahle | 277/59 |
| 2,504,936 | 4/1950 | Payne | 277/59 |
| 2,714,024 | 7/1955 | Greene | 277/2 |
| 3,258,271 | 6/1966 | Hollingsworth | 277/2 |

*Primary Examiner*—Robert I. Smith
*Attorney, Agent, or Firm*—Bean & Bean

[57] ABSTRACT

A remotely chargeable stuffing box adapted for below ground or other inaccessible installations includes telescopically arranged inner and outer members; the outer member being formed with a pair of axially spaced, annular, inwardly opening chambers prepacked with a semi-plastic packing composition axially confined within each chamber by axially spaced annular sealing rings. An annular rib, which serves as a common boundary for the chambers is formed with an annular inwardly opening groove into which is introduced a semi-liquid packing composition adapted to permeate and fill any leakage voids or fissures occurring in the semi-plastic packing composition and its associated sealing rings adjacent the surface of the inner member. As required, the semi-liquid packing composition may be replenished through one or more charging lines having inlets enclosed within a service box arranged adjacent ground level or other accessible point.

4 Claims, 3 Drawing Figures

3,876,213

REMOTE FILL STUFFING BOX

BACKGROUND OF THE INVENTION

Stuffing boxes of the type employing pressurized semi-plastic packing material to establish a seal between telescopically arranged members of an expansion joint or between a cable and a wall opening are well known, as evidenced for example by U.S. Pat. Nos. 1,953,493; 1,960,041; 1,989,644; 2,319,543 and 2,504,936.

Present day adaptations of expansion joint type stuffing boxes normally include outer and inner members, which are suitably affixed to adjacent ends of a pair of pipe sections. The outer member is formed with a single annular inwardly opening cavity into which is introduced a pressurized packing composition for the purpose of deforming annular sealing rings arranged adjacent opposite ends of the chamber to insure sealing contact thereof with the inner member. Normally, the packing composition employed is semi-plastic in nature in that it is intentionally relatively viscous or "full bodied" in order to permit same to deform the sealing rings without being lost from the chamber by extrusion between the sealing rings and the surface of the inner member. A drawback of this type of stuffing box construction is that the packing composition is not sufficiently "flowable" to permit same to be supplied to the stuffing box from a relatively remote point. Thus, stuffing boxes employing a semi-plastic packing composition must be readily accessible, such as afforded by placing same within a manhole or the like.

There have also been numerous proposals for supplying a semi-liquid packing composition, which is sufficiently flowable to permit recharging of relatively inaccessible stuffing boxes. However, the relatively "fluid" nature of this type of packing composition does not admit to its use in high pressure stuffing boxes in that it is not capable of properly deforming the stuffing box packing rings sufficiently to provide an adequate seal and there is a tendency for the semi-liquid packing composition to leak from the stuffing box between the packing rings and surface of the inner member.

SUMMARY OF THE INVENTION

The present invention is directed towards a stuffing box construction particularly adapted for use in adding packing to expansion joints or the like which are relatively inaccessible during use.

The stuffing box of the present invention includes concentrically arranged inner and outer members, wherein the outer member is formed with two axially spaced inwardly opening annular packing chambers, which are permanently charged with a semi-plastic packing composition serving to deform annular sealing rings positioned adjacent the ends of each chamber into sealing engagement with the outer surface of the inner member. An annular rib, which serves as a common boundary for the chambers, is formed with an annular inwardly opening groove into which is introduced a semi-liquid packing composition adapted to fill and seal any leakage void or fissure occurring in the semi-plastic packing composition and its associated sealing rings adjacent the surface of the inner member. The semi-liquid packing composition is sufficiently flowable to permit re-charging of the annular groove through one or more charging lines having inlets arranged within a service box disclosed adjacent ground level or other accessible point.

DRAWINGS

The nature and mode of operation of the present invention will now be more fully described in the following detailed description taken with the accompanying drawings wherein.

DETAILED DESCRIPTION

Figure 1:
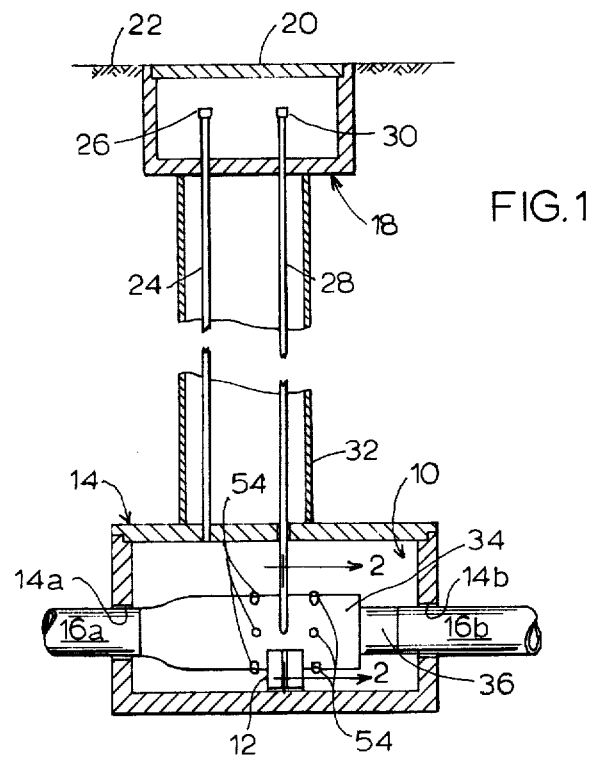
FIG. 1 is an elevational view showing a below ground stuffing box installation.

A stuffing box formed in accordance with the present invention is generally designated as 10 in FIG. 1 and shown as being supported by an optional mounting bracket 12 within a concrete or other suitable protective sub-surface enclosure 14 for the purpose of providing a fluid sealed expansion joint between adjacent ends of fluid conduit sections 16a and 16b, such as sections of a steam pipe which are subject to thermally induced expansions and contractions. Conduit sections 16a and 16b are movably received within apertures 14a and 14b formed in the side walls of enclosure 14. A small inspection or expansion joint servicing box 18, which is disposed vertically above enclosure 14 is provided with a removable access cover 20 arranged essentially flush with the surface of the ground or street 22.

Also in FIG. 1, a test or sampling pipe 24 is shown as having its lower end arranged in fluid communication with the interior of enclosure 14 and its upper end disposed within a box 18 and closed by a suitable pressure relief valve or shut off valve 26. The purpose of pipe 24 is to permit periodic remote inspections by a maintenance employee or inspector of stuffing box 10 by sampling or observing the environment existing within enclosure 14 in order to determine whether conveyed fluid is leaking from the stuffing box. If a leak is detected, fresh packing composition to be hereinafter described would be applied to the stuffing box 10 through one or more charging lines 28, which have their upper ends provided with a check valve type fitting or other suitable pressure sealed closure 30 to permit same to be removably coupled to a pressurized packing material charging gun or like device, not shown. Pipe 24 and charging lines 28 may be enclosed within a riser casing 32.

Figure 2:
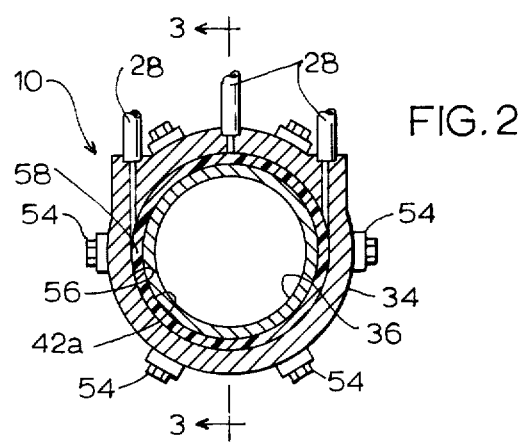
FIG. 2 is a sectional view taken generally along line 2—2 in FIG. 1.
Figure 3:
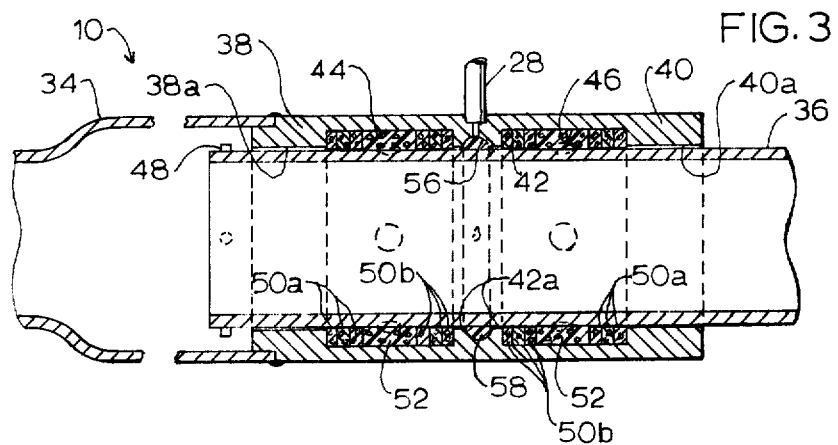
FIG. 3 is a vertical sectional view taken generally along line 3—3 in FIG. 2.

In FIGS. 1, 2 and 3, stuffing box 10 is shown as including generally cylindrical, concentrically arranged outer and inner members 34 and 36, which are suitably end connected, such as by welding, to adjacent ends of conduit sections 16a and 16b, respectively. Outer member 34 may be characterized as having axially spaced annular end portions 38 and 40 and an intermediate annular rib portion 42, which cooperate to define a pair of axially spaced, radially inwardly opening, annular main packing chambers or cavities 44 and 46. End portions 38 and 40 define annular or cylindrical guide surfaces 38a and 40a, respectively, which are dimensioned to receive inner member 36 in a relatively close fit, but free sliding relationship. Preferably, rib 42 is equally spaced from end portions 38 and 40 and is formed with a similarly sized internal dimension such that it defines an intermediate guide surface 42a. This is a particularly important feature of the present construction, since it better insures straight line sliding movements of the inner and outer members for any given tolerance between such members, i.e., the presence of rib guide surface 42a constrains "cocking" of the members to one half that which might be encountered if only end guide surfaces 38 and 40a were to be employed. As is conventional with telescopic type stuffing box constructions, inner member 36 may be provided with projecting stops 48 arranged to cooperate with end portion 38 to prevent inadvertent separation of members 34 and 36.

As in the case of a conventional single chamber stuffing box construction, two groups of identical packing or sealing rings 50a and 50b are disposed within and adjacent opposite ends of each of main chambers 44 and 46 and are normally maintained in firm engagement with facing surfaces of end portions 38 and 40 and rib 42 by a pressurized, semi-plastic packing composition 52. In use, packing rings 50a, 50b are deformed by the pressure of semi-plastic packing composition 52 to lie in fluid sealing, slide fitting engagement with the outer surface of inner member 36.

In accordance with present day practice, packing composition 52 is introduced under pressure into chambers 44 and 46 through fittings 54 before the stuffing box leaves its point of manufacture. As required, additional packing material may be introduced through fittings 54 in the field after members 34 and 36 are joined to conduit sections 16a and 16b, but before enclosure 14 is covered. For purposes of reference, packing rings 50a and 50b are conventional from the standpoint that they have a square cross-sectional configuration and are formed of either a fluorocarbon impregnated asbestos or rubber impregnated asbestos depending upon whether the fluid being conveyed is hot or cold. In a like manner, packing composition 52 may comprise a long fibered asbestos mixed with oil or grease and granules or flakes of either a fluorocarbon or graphite depending upon the temperature of the conveyed fluid. A semi-plastic packing composition, while being necessarily "flowable" to an extent sufficient to permit its being injected directly into the chambers through fittings 54, is on the other hand required to be "full bodied" or relatively viscous, due to the requirement that it be operable to squeeze packing rings 50a, 50b without being extruded therepast along the surface of inner member 36. The term "fluorocarbon" is meant to include fluorinated polymers of the type described in U.S. Pat. No. 3,445,393, whose disclosure is incorporated herein for purposes of reference.

The relative viscous nature of packing composition 52 makes it impossible to add make-up material to chambers 44 and 46 from a relatively remote point and thus limits the use of a conventional single chamber stuffing box charged with this material to man-hole or other installation permitting ready access to fittings 54. As by way of example, semi-plastic packing composition of the type herein contemplated are not sufficiently flowable to permit same to be forced through a conventional one-fourth inch to three-eighths inch charging line of a length greater than about one and two feet.

In addition to employing rib 42 to form a common boundary for a pair of separate packing chambers, the present invention also departs from conventional single chamber stuffing box constructions in that rib 42 is formed with a relatively shallow annular groove or additional packing chamber 56 for receiving a semi-liquid packing composition 58, which is maintained under a pressure approximating that applied to packing composition 52. As required, additional packing composition may be supplied to groove 56 through one or more of lines 28. While for many installations a single charging line would be satisfactory, it is preferable to provide at least two charging lines to insure uniformity of distribution of the packing material annularly of groove 56. Also, when providing more than one charging line, certain of such lines may be selectively used as a discharge line through which old or deteriorated packing composition may be "flushed" from the stuffing box. It is preferable to arrange at least one of the charging lines for tangential entry into groove 56, as indicated in FIG. 2, in order to effect distribution of the packing composition without exerting excessive radially inwardly directed pressure on inner member 36.

The semi-liquid packing composition would typically comprise granuals or flakes of a suitable fluorocarbon mixed with an oil or grease serving as a carrier. As a practical matter, this composition may be quite similar to the above described semi-plastic composition with the notable exception that the latter contains a substantial amount of asbestos or similar "full body" producing material. For high temperature applications, the oil would be of a high temperature variety, i.e., silicone and constitute about twenty percent by weight of the composition. However, more or less high temperature oil may be used depending on the distance through which the mixture is to be pumped and size of the charging line. This composition is intentionally non-viscous or fluid under pressure, as compared to the conventional semi-plastic packing composition disposed in chambers 44 and 46 in order to permit it to permeate and fill any leakage voids or fissures occurring in the semi-plastic packing composition and its associated packing rings, as well as to permit it to be "pumped" over a distance of between about ten to fifteen feet through a one-fourth inch to three-eighths inch charging line by a suitable pressure charging gun.

It is a particularly important feature of the present invention that the semi-liquid packing composition is applied directly to the surface of inner member 36 where failure of the seal in either of the adjacent packing chambers will normally occur. In effect, the carrier oil serves to convey the "solid" plastic or fluorocarbon packing component of the semi-liquid packing composition into the voids or fissures wherein such "solid" plastic component wedges or lodges to effect sealing of the leak. It is important to note that the relatively low viscosity of the semi-liquid packing composition is such as to prevent its effective use as a substitute for the semi-plastic composition in the main packing chambers. In other words, the semi-liquid composition must be employed in combination with the semi-plastic composition and the packing rings, the latter serving to normally confine the former until such time as a void or fissure is created. When this occurs the semi-liquid packing composition is permitted to "seep" or flow under pressure into the void and its solid components are then effective to fill the void and block escape of the conveyed fluid, as well as to prevent further escape of the semi-liquid packing composition from between packing rings 50b–50b. Moreover, it will be understood that as the conduit sections expand or contract, the semi-liquid packing composition will serve to coat the surface of inner member 36 in order to reduce friction forces; the coating of the inner member in turn serving to coat the inner member contact surfaces of packing rings 50b and 50a in order to rejuvenate the lubricating properties thereof.

It is anticipated that makeup or additional semi-liquid packing composition will have to be supplied to groove 56 with a greater degree of regularity for high temperature installations than for normal or relatively low temperature installations in that for temperatures in the range of between about 500° and 600°F there is a tendency for the "solid" plastic component and carrier oils to vaporize even under the high pressure conditions maintained within the stuffing box.

Also, while the present stuffing box has been specifically described in connection with a "buried" installation, it is anticipated that it possesses general utility for use in any installation where limited access dictates charging of the stuffing box from a remote point.

We claim:

1. A stuffing box for providing a fluid sealed expansion joint between adjacent ends of fluid conduit sections wherein said stuffing box comprises telescopically arranged outer and inner members adapted to be connected one to each of said adjacent ends, said outer member defining a pair of axially spaced main packing chambers and an additional packing chamber disposed intermediate said main chambers, each of said chambers being of inwardly open annular configuration, a plurality of packing rings disposed adjacent opposite ends of each of said main chambers and concentrically of said inner member, semi-plastic packing composition disposed in each of said main chambers axially intermediate said packing rings and maintained under a pressure sufficient to maintain said packing rings in spaced relationship and to deform said packing rings into fluid sealing engagement with an outer surface of said inner member, said semi-plastic packing composition being sufficiently viscous to prevent loss thereof from said main chambers by extrusion between said packing rings and said outer surface of said inner member, a pressurized semi-liquid packing composition disposed in said additional chamber, said semi-liquid packing composition including a solid packing component and a carrier therefor, said semi-plastic composition and said packing rings normally preventing flow of said semi-liquid packing composition along said outer surface away from said additional chamber said semi-liquid packing composition being non-viscous under a pressure approximating said pressure as compared to said semi-plastic composition whereby to permit said carrier, upon the occurrence of a leakage void in said main chambers adjacent said outer surface of said inner member, to convey said solid component along said outer surface of said inner member away from said additional chamber for sealing within said leakage void, and means for introducing additional semi-liquid packing composition into said additional chamber.

2. A stuffing box for providing a fluid sealed expansion joint between adjacent ends of fluid conduit sections including outer and inner members adapted to be connected one to each of said adjacent ends, said outer member having axially spaced annular end portions and an intermediate annular rib portion cooperating to define a pair of axially spaced radially inwardly opening annular packing chambers, said end portions and said rib portion defining annular guide surfaces dimensioned to receive said inner member in a slide fitting relationship, said annular guide surface of said rib portion being formed with an annular radially inwardly opening groove, a plurality of packing rings arranged adjacent opposite ends of each said chambers in engagement with said end portions and said rib portion and disposed concentrically of said inner member, semi-plastic packing composition filling each of said chambers axially intermediate said packing rings and being maintained under a pressure sufficient to maintain said packing rings in a spaced relationship and to deform said packing rings into fluid sealing engagement with an outer surface of said inner member, said semi-plastic packing composition being sufficiently viscous to prevent loss thereof from said packing chambers by extrusion between said packing rings and said outer surface of said inner member, semi-liquid packing composition filling said groove and being maintained under pressure approximating that of said semi-plastic packing composition, said semi-liquid composition including a solid packing component and a carrier therefor, said semi-plastic composition and said packing rings normally preventing flow of said semi-liquid packing composition along said outer surface of said inner member in directions away from said groove, said semi-liquid packing composition being non-viscous as compared to said semi-plastic composition whereby to permit said carrier, upon the occurrence of a leakage void in said packing chambers adjacent said outer surface of said inner member, to convey said solid component along said outer surface of said inner member away from said groove for sealing within said leakage void, and means for supplying additional semi-liquid packing composition to said groove from a point remote from said stuffing box.

3. A below ground installation for coupling sections of a conduit subject to thermal expansion including in combination:

a sub-surface enclosure having apertures for receiving adjacent ends of said sections;

a stuffing box arranged within said enclosure for forming a fluid sealed expansion joint between said sections, said stuffing box including outer and inner members fixed one to each of said adjacent ends, said outer member defining a pair of axially spaced main packing chambers and an additional packing chamber disposed intermediate said main chambers, each of said chambers being of inwardly open annular configuration, a plurality of packing rings disposed adjacent opposite ends of said main chambers and concentrically of said inner member, semi-plastic packing composition permanently sealed in each of said main chambers at a pressure sufficient to deform said packing rings into fluid sealing engagement with an outer surface of said inner member, a semi-liquid packing composition disposed in said additional chamber and maintained under a pressure approximating the pressure of said semi-plastic packing compositions, said semi-plastic packing composition and said packing rings normally preventing flow of said semi-liquid packing composition along the surface of said inner member in directions away from said additional chamber;

an inspection box disposed adjacent the surface of said ground and accessible to a workman for inspection/maintenance of said stuffing box;

an inspection pipe for placing said inspection box in flow communication with said enclosure; and at least one charging line for placing said additional chamber in flow communication with said inspection box, an end of said charging line arranged within said inspection box having a pressure sealed closure permitting charging of said additional chamber with additional semi-liquid packing composition under pressure.

4. An installation according to claim 2, wherein said outer member is formed with axially spaced annular end portions and an intermediate annular rib portion cooperating to define said main packing chambers, said end portions and said rib portions defining annular guide surfaces dimensioned to receive said inner members in a slide fitting relationship, and said annular guide surface of said rib portion is formed with an annular groove defining said additional chamber.

* * * * *